(12) United States Patent
Niu et al.

(10) Patent No.: US 12,602,377 B2
(45) Date of Patent: Apr. 14, 2026

(54) SYSTEMS AND METHODS FOR QUESTION ANSWERING WITH DIVERSE KNOWLEDGE SOURCES

(71) Applicant: Salesforce, Inc., San Francisco, CA (US)

(72) Inventors: Tong Niu, Sunnyvale, CA (US); Shafiq Rayhan Joty, San Jose, CA (US); Yingbo Zhou, Palo Alto, CA (US); Semih Yavuz, Redwood City, CA (US); Wenting Zhao, San Francisco, CA (US); Ye Liu, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 188 days.

(21) Appl. No.: 18/423,836

(22) Filed: Jan. 26, 2024

(65) Prior Publication Data

US 2025/0103592 A1     Mar. 27, 2025

Related U.S. Application Data

(60) Provisional application No. 63/585,123, filed on Sep. 25, 2023.

(51) Int. Cl.
| | |
|---|---|
| *G06F 16/2452* | (2019.01) |
| *G06F 40/295* | (2020.01) |
| *G06F 40/30* | (2020.01) |
| *G06F 40/40* | (2020.01) |

(52) U.S. Cl.
CPC ...... *G06F 16/24522* (2019.01); *G06F 40/295* (2020.01); *G06F 40/30* (2020.01); *G06F 40/40* (2020.01)

(58) Field of Classification Search
CPC ......... G06F 40/40; G06F 40/295; G06F 40/30
See application file for complete search history.

(56) References Cited

U.S. PATENT DOCUMENTS

2023/0316001 A1* 10/2023 Araki ................... G06F 40/295

OTHER PUBLICATIONS

Pramanik, Soumajit, et al. "Uniqorn: unified question answering over RDF knowledge graphs and natural language text." arXiv: 2108.08614v7 Jul. 10, 2023 (Year: 2023).*

(Continued)

*Primary Examiner* — Bhavesh M Mehta
*Assistant Examiner* — Joseph J. Yamamoto
(74) *Attorney, Agent, or Firm* — Haynes and Boone, LLP

(57) ABSTRACT

Embodiments described herein provide systems and methods for retrieval augmented generation. A neural network based language model may be provided a question as a user input. Based on the user input, semantically diverse queries may be generated for retrieval from diverse data sources. For example, a structured data source (e.g., database or knowledge base) and unstructured data (e.g., text articles) may be used to retrieve information relevant to the user input. The retrieve information may be ranked so that the most relevant information is used by the language model in generating an answer to the question in the user input. A non-retrieval based answer generated by the language model may be utilized in some embodiments in generating the final answer.

20 Claims, 9 Drawing Sheets

(56)        References Cited

OTHER PUBLICATIONS

Omar Khattab, Keshav Santhanam, Xiang Lisa Li, David Hall, Percy Liang, Christopher Potts, and Matei Zaharia. 2022. Demonstrate-search-predict: Composing retrieval and language models for knowledge-intensive nlp. arXiv preprint arXiv:2212.14024.

Wenhu Chen, Ming-Wei Chang, Eva Schlinger, William Wang, and William W Cohen. 2021a. Open question answering over tables and text. Proceedings of ICLR 2021.

International Search Report and Written Opinion for PCT/US2024/048155, dated Jan. 9, 2025, 16 pages.

Anonymous, "Large language model—Wikipedia", Retrieved from the Internet: URL:https://en.wikipedia.org/w/index.php? title=Large_language_model&oldid=1172845164, Aug. 29, 2023, pp. 1-17.

Ma et al., "Query Rewriting in Retrieval-Augmented Large Language Models", Proceedings of the 2023 Conference on Empirical Methods in Natural Language Processing, May 23, 2023, pp. 1-17.

Pramanik et al., "UNIQORN: Unified Question Answering over RDF Knowledge Graphs and Natural Language Text", arxiv.org, Cornell University Library, 201 Olin Library Cornell University Ithaca, NY 14853, Aug. 19, 2021, pp. 1-27.

Shen et al., "Large Language Models Are Strong Zero-Shot Retriever", arxiv.org, Cornell University Library, 201 Olin Library Cornell University Ithaca, NY 14853, Aug. 2, 2023, 15 pages.

* cited by examiner

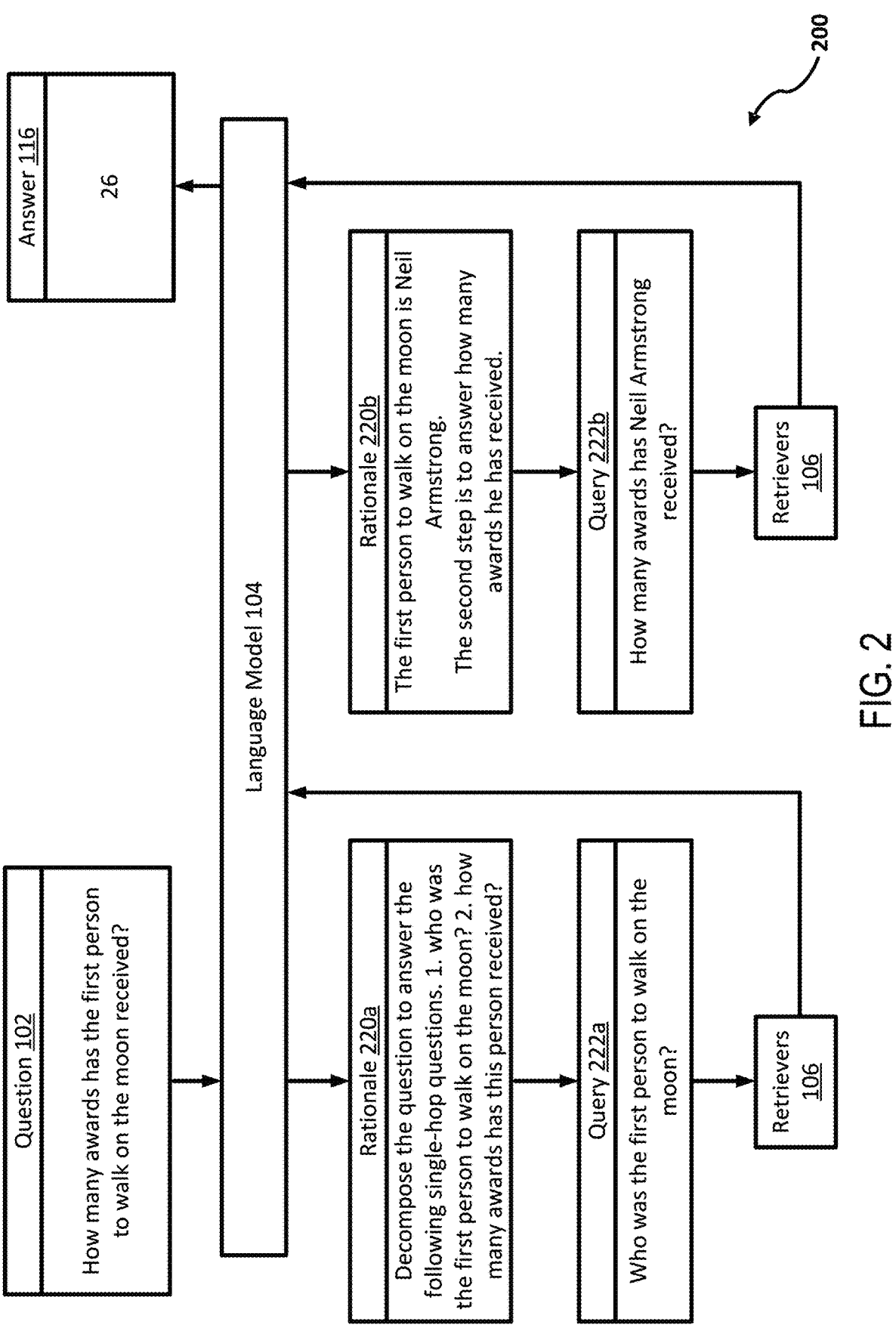

FIG. 2

Answer 116

26

Language Model 104

Question 102

How many awards has the first person to walk on the moon received?

Rationale 220a

Decompose the question to answer the following single-hop questions. 1. who was the first person to walk on the moon? 2. how many awards has this person received?

Query 222a

Who was the first person to walk on the moon?

Retrievers 106

Rationale 220b

The first person to walk on the moon is Neil Armstrong.

The second step is to answer how many awards he has received.

Query 222b

How many awards has Neil Armstrong received?

Retrievers 106

200

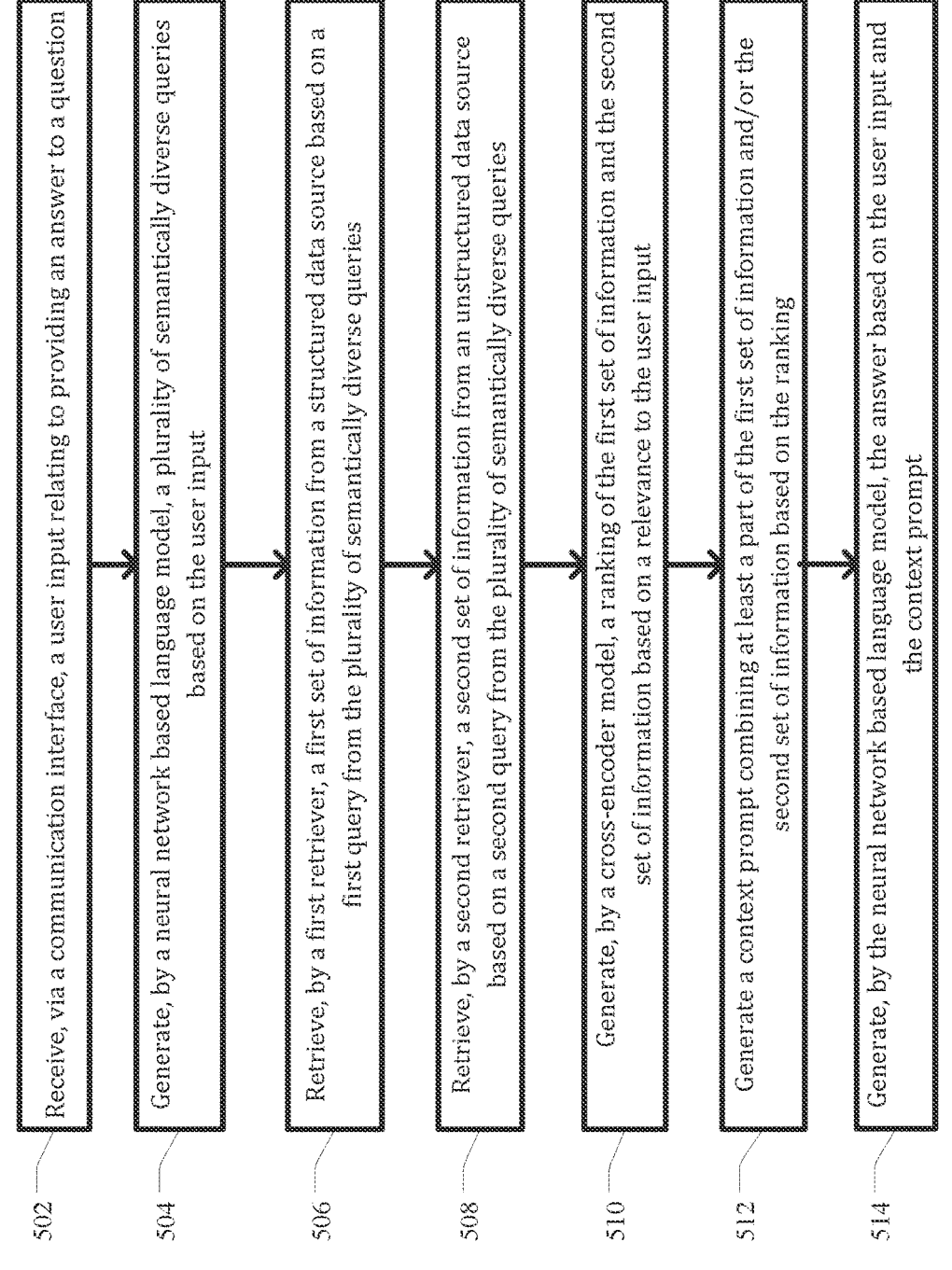

Receive, via a communication interface, a user input relating to providing an answer to a question Generate, by a neural network based language model, a plurality of semantically diverse queries based on the user input Retrieve, by a first retriever, a first set of information from a structured data source based on a first query from the plurality of semantically diverse queries Retrieve, by a second retriever, a second set of information from an unstructured data source based on a second query from the plurality of semantically diverse queries Generate, by a cross-encoder model, a ranking of the first set of information and the second set of information based on a relevance to the user input Generate a context prompt combining at least a part of the first set of information and/or the second set of information based on the ranking Generate, by the neural network based language model, the answer based on the user input and the context prompt 502
504
506
508
510
512
514

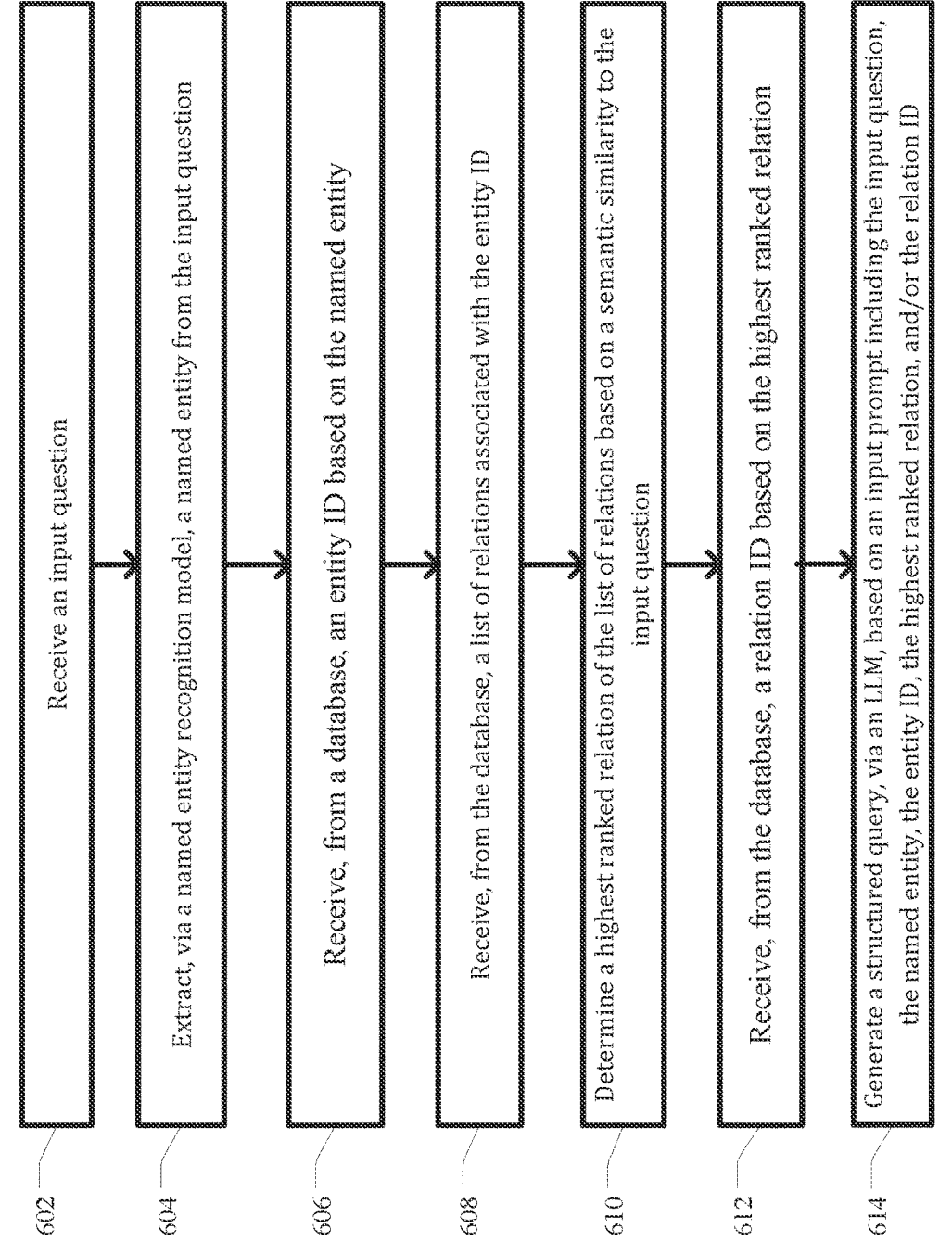

602 — Receive an input question

604 — Extract, via a named entity recognition model, a named entity from the input question 606 — Receive, from a database, an entity ID based on the named entity 608 — Receive, from the database, a list of relations associated with the entity ID 610 — Determine a highest ranked relation of the list of relations based on a semantic similarity to the input question 612 — Receive, from the database, a relation ID based on the highest ranked relation 614 — Generate a structured query, via an LLM, based on an input prompt including the input question, the named entity, the entity ID, the highest ranked relation, and/or the relation ID

|  | EM | F1 | Recall | H1-R | H2-R |
|---|---|---|---|---|---|
| Vanilla Prompt | 26.0 | 28.3 | 26.8 | 42.2 | - |
| ReAct | 16.1 | 18.4 | 19.0 | - | - |
| DSP | 27.9 | 31.0 | 31.2 | 57.6 | 41.2 |
| DETLLM (our) | 32.1 | 35.7 | 35.6 | 70.1 | 47.1 |

FIG. 7

|  | EM | F1 | Recall | H1-R | H2-R |
|---|---|---|---|---|---|
| w/o SPARQL |  |  |  |  |  |
| Text-KB(Sparse) | 27.9 | 31.0 | 31.2 | 57.6 | 41.2 |
| Text-KB(Dense) | 22.7 | 26.1 | 26.9 | 54.9 | 32.0 |
| Text(Sparse)-KB(Sparse) | 26.4 | 29.8 | 30.2 | 60.0 | 41.2 |
| Text(Dense)-KB(Sparse) | 30.7 | 35.0 | 35.5 | 68.9 | 46.8 |
| w/ SPARQL |  |  |  |  |  |
| Text-KB(Sparse) | 28.8 | 31.9 | 32.9 | 58.0 | 42.9 |
| Text-KB(Dense) | 31.2 | 34.7 | 35.9 | 64.3 | 42.6 |
| Text(Sparse)-KB(Sparse) | 28.5 | 31.8 | 32.0 | 61.5 | 42.1 |
| DETLLM (our) | 32.1 | 35.7 | 35.6 | 70.1 | 47.1 |

FIG. 8

|  | QID | QID+REL | QID* |
|---|---|---|---|
| Text-KB(Sparse) | 26.5 | 22.4 | 6.91 |
| Text-KB(Dense) | 31.8 | 27.6 | 7.87 |
| Text(Sparse)-KB(Sparse) | 26.3 | 22.6 | 7.34 |
| Text(Dense)-KB(Sparse) | 29.7 | 26.5 | 7.66 |

FIG. 9

|  | EM | F1 | Recall | H1-R | H2-R |
|---|---|---|---|---|---|
| Oracle_Text | 26.8 | 31.3 | 33.4 | 96.4 | 51.7 |
| Oracle_KB | 38.1 | 40.0 | 42.2 | 100.0 | 62.1 |
| Oracle_All | 48.7 | 52.2 | 52.8 | 100.0 | 96.7 |

FIG. 10

|  | EM | F1 | Recall | H1-R | H2-R |
|---|---|---|---|---|---|
| Closed Book | 30.2 | 33.8 | 31.2 | - | - |
| DetLLM | 32.1 | 35.7 | 35.6 | 70.1 | 47.1 |

FIG. 11

SYSTEMS AND METHODS FOR QUESTION ANSWERING WITH DIVERSE KNOWLEDGE SOURCES

CROSS REFERENCE(S)

The instant application is a nonprovisional of and claim priority under 35 U.S.C. 119 to U.S. provisional application No. 63/585,123, filed Sep. 25, 2023, which is hereby expressly incorporated by reference herein in its entirety.

TECHNICAL FIELD

The embodiments relate generally to machine learning systems for question answering, and more specifically to systems and methods for question answering with diverse knowledge sources.

BACKGROUND

Large Language Models may be used to complete a variety of tasks by giving the LLM an appropriate prompt, including answering questions. An "augmented" LLM is a system that includes an external data source in addition to the LLM itself which provides additional data/information. A "retriever" is used to retrieve information from the external data source. For example, to answer the question "Who is the author of Harry Potter?", an LLM may generate a search query for a retriever. Using the query, the retriever may return the desired information, which may be input as part of a second prompt to the LLM so that the LLM can generate a natural language response to the question using the retrieved information. In the example given, the retriever may return a paragraph of text from the Wikipedia entry for Harry Potter, and the LLM may generate an answer to the question utilizing that paragraph of text. One problem that exists in answering questions with external information by an LLM is that the generated text response may often bias towards the retrieved information.

BRIEF DESCRIPTION OF THE DRAWINGS

FIG. 2 is a simplified diagram illustrating a multi-step retrieval augmented generation framework according to some embodiments.

FIG. 5 is an example logic flow diagram illustrating a method of retrieval augmented generation based on the framework shown in FIGS. 1-2, according to some embodiments.

FIG. 6 is an example logic flow diagram illustrating a method of structured query generation, according to some embodiments described herein.

FIGS. 7-11 provide charts illustrating exemplary performance of different embodiments described herein.

Figure 1:
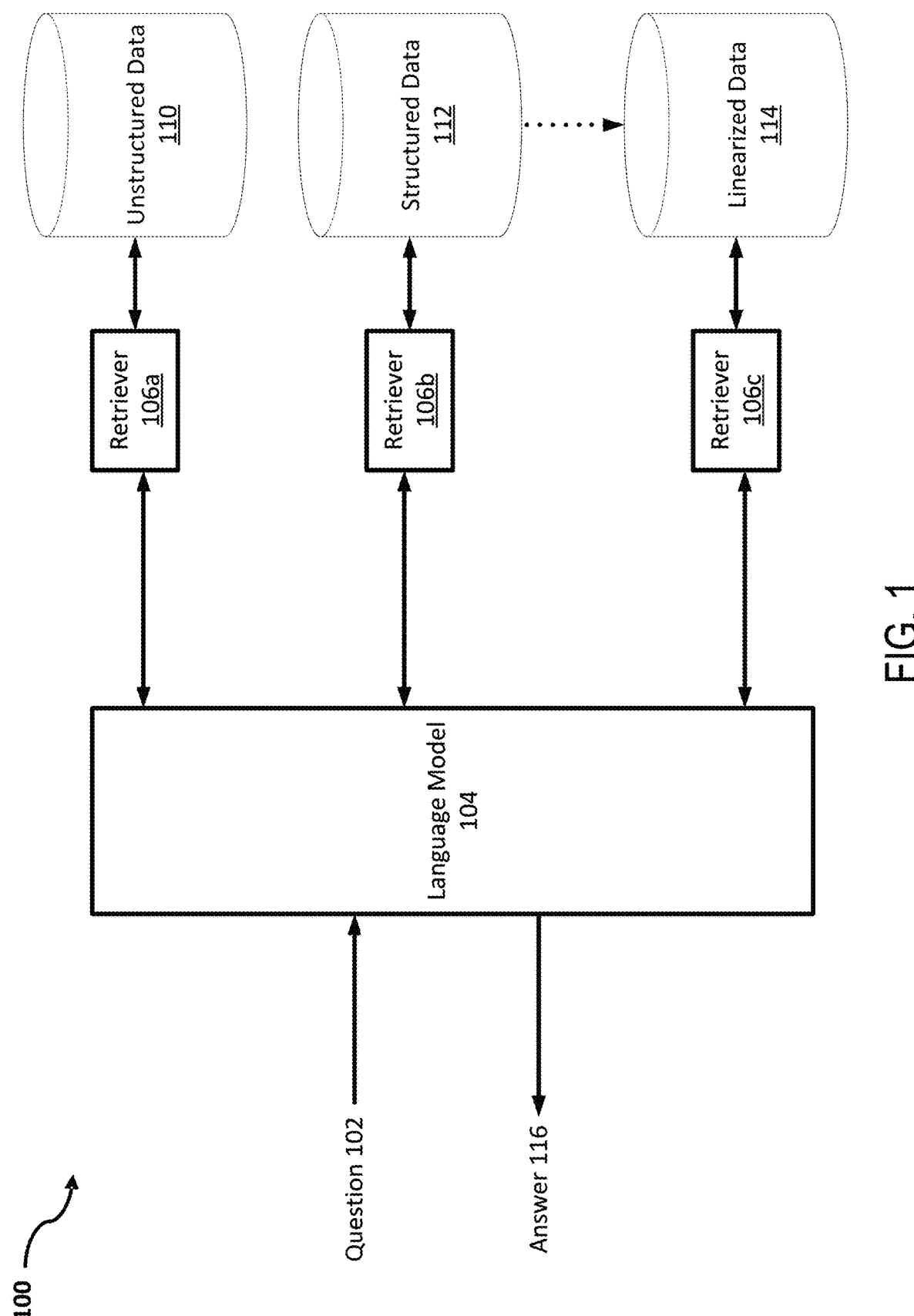
FIG. 1 is a simplified diagram illustrating a retrieval augmented generation framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "Large Language Model" (LLM) may refer to a neural network based deep learning system designed to understand and generate human languages. An LLM may adopt a Transformer architecture that often entails a significant amount of parameters (neural network weights) and computational complexity. For example, LLM such as Generative Pre-trained Transformer (GPT) 3 has 175 billion parameters, Text-to-Text Transfer Transformers (T5) has around 11 billion parameters. As used herein, the term "language model" (LM) may refer generally to a language model, which may be an LLM, or another language model. In some embodiments, LMs described herein may be LLMs. In some embodiments, LMs described herein may not be considered LLMs. In some embodiments, functions performed as described herein by a LLM may be performed by a LM.

Overview

A Retrieval augmented generation (RAG) model may comprise an "augmented" LLM that first retrieves information from external data sources based on an input query, and use the retrieved information as context to generate a text response. One problem that exists in answering questions with external information by an LLM is that the generated text response may often bias towards the retrieved information.

In view of the need for question answering systems, embodiments described herein provide LLM response generation based on diverse retrieval (i.e., retrieval from different types of data sources). For example, a LLM may receive a user input such as "How many awards has the first person to walk on the moon received?", which may be answered by the LLM based on a multi-tier retrieval process. Specifically, the LLM system may have access to different types of information, such as unstructured data (articles from Wikipedia), in addition to a structured source of information (e.g., a database or knowledge base such as WikiData). A first retriever may be used to search the unstructured data (e.g., Wikipedia articles), and return relevant paragraphs relating to a user input. A second retriever may retrieve data from a structured database using a structured query generated by the LLM from the user input. A third retriever may retrieve data from the structured database, but treat the data as unstructured text, for example by converting triplets (subject, relation, object) into a string format and searching the database as if it were unstructured text. A cross-encoder model may then rank the retrieved data from the retrievers by comparing each retriever output to the user input. The consolidated data is then formed into a second prompt (e.g., by concatenating the highest ranked retrieved text) which supplements the user input so that the LLM may generate an answer.

Embodiments described herein provide a number of benefits. For example, the incorporation of diverse retrieval tools including symbolic query generation allows for the model to generate responses more accurately using a broader range of available information. By generating structured queries, precise knowledge may be efficiently retrieved. The use of accurate structured queries allows the system to rely less on the reasoning capability of an LLM, allowing for smaller more efficient LLMs to be utilized, further reducing memory and/or computation resources. Ranking the retrieved information allows for the system to use a smaller set of inputs to the LLM and therefore require fewer memory and/or computation resources. In this way, computational and hardware efficiency of deploying a RAG system may be improved, and thus neural network technology in NLP is improved.

FIG. 1 is a simplified diagram illustrating a retrieval augmented generation framework 100 according to some embodiments. The framework 100 comprises a language model 104 in communication with diverse data sources which may include unstructured data 110, structured data 112, and/or linearized data 114. The data sources may be accessed by use of retrievers 106a-106c. The language model 104 may be an LLM, and/or any generative text model of different scales.

At a high level, language model 104 receives a question 102, retrieves relevant information from the data sources via retrievers 106, and an updated prompt for language model 104 includes retrieved information in a context prompt so that language model may generate answer 116 using the retrieved information.

Question 102 may be input to a language model 104 as a prompt or part of a prompt. For example, question 102 may be used together with a prompt template that instructs the language model 104 to break question 104 into multiple separate questions, generate queries for retrievers 106, etc. For example, the prompt template may be: "break the following multi-hop question into a series of single-hop questions: [multi-hop question]" where "[multi-hop question]" is replaced with question 102. In some embodiments, language model 104 may be provided prompts prior to being provided question 102, providing the context for using the retrievers for question answering.

Retrievers 106a-106c may be used by language model 104 to retrieve information from various data sources. In some embodiments, functions performed by retrievers 106 are performed all or in part by language model 104. In some embodiments, more or fewer data sources and/or retrievers may be used based on available data. In addressing single-hop questions, in some embodiments, language model 104 generates semantically diverse queries for the different data sources. Language model 104 may be input a prompt requesting one or more queries based on question 102. For example, a query for an unstructured data source 110, the query may be a natural language query, and for a structured data source 112, the query may be in a specific structured format. In some embodiments, multiple queries may be generated for one or more of the retrievers 106. For example, language model 104 may have a "temperature" setting that may be used to control a level of randomness in generated outputs. By setting the temperature to a certain level (e.g., 0.7), language model 104 may generate different variations of queries using the same input question 102.

In some embodiments, unstructured and structured knowledge are treated separately, and relevant information is retrieved from both knowledge sources. In some embodiments, retriever 106a for unstructured data 110 is a dense retriever configured to retrieve relevant passages from the unstructured data 110. In some embodiments, structured data 112 is retrieved using a symbolic query language generated by retriever 106b and/or language model 104. In some embodiments, language model 104 generates symbolic query language utilizing previously retrieved information (e.g., available IDs in a knowledge base) as described in FIG. 6. The symbolic query language may retrieve specific information, and may be used to perform certain operations on the retrieved information. For example, a query may be generated which aggregates retrieved information. Aggregation may return a numerical number in response to a query based on the number of entries that match the query. In some embodiments, the structured query language is a database or knowledge base access query such as SPARQL. In some embodiments, linearized data 114 is a linearized version of structured data 112. For example, structured data 112 may include a knowledge base of triplets (subject, relation, object). Linearizing the knowledge base triplets of structured data 112 may include converting the triplets into a string format "subject relation object". In some embodiments, retriever 106c is a sparse retriever configured to retrieve text from linearized data 114. In some embodiments, information is retrieved via retrievers 106 from all available data sources (e.g., unstructured data 110, structured data 112, and linearized data 114).

Language model 104 may have intrinsic knowledge acquired during training which is pertinent to question 102. Language model 104 may have intrinsic knowledge sufficient to accurately respond to a question without retrieval. In some embodiments, language model 104 may generate a response to an input question without retrieval. The non-retrieval based response may be used as the response if the confidence is above a predetermined threshold and retrieval may be skipped. Confidence in a non-retrieval based response may be determined, for example, by prompting the language model 104 to provide a confidence score with a generated response. Confidence in a non-retrieval based response may also be determined by computing the likelihood of the generated response via the language model outputs. For example, a query may be input to language model 104 to generate a response. The query may be input to language model 104 a second time and the likelihood of each token in the generated response may be computed.

In some embodiments, the non-retrieval based response may be considered together with retrieved information, and language model 104 may be provided with the retrieved information together with the non-retrieval based response and generate an answer 116 based on those inputs. In some embodiments, a non-retrieval based response may be used as answer 116 based on a determination that the retrieved information is insufficient. For example, if the ranking process generates scores for all retrieved information below a certain threshold, the system may determine that none of the retrieved information is sufficiently relevant, and use the non-retrieval based response as answer 116.

Retrieved information may be ranked according to relevance or by another metric, and the highest ranking information (e.g., the top k ranked portions of information) may be provided as part of an updated prompt for language model 104. In some embodiments, the highest ranking information up to the amount of information as limited by a limitation of the prompt size for language model 104 may be included in the prompt. In some embodiments, a predetermined amount of information of the highest ranked information is included in the updated prompt. In some embodiments, information is ranked based on a comparison between the retrieved information and question 102, for example via a cross-encoding model. In some embodiments, question 102 is encoded via an encoder into a first vector representation, and retrieved information is individually encoded into respective vector representations via an encoder. In some embodiments, the ranking of information may be determined based on a distance between the question 102 vector representation and the respective retrieved information vector representations. In some embodiments, information from all sources is ranked together, and the highest ranking from all the information is used in the updated prompt. In some embodiments, information from the different sources is ranked separately, and the highest ranking information from each of the sources is included in the updated prompt.

Answer 116 may be displayed to a user via a user interface device. In some embodiments, the source of the retrieved information provided to the language model for generating answer 116 may also be displayed to the user via the user interface device.

FIG. 2 is a simplified diagram illustrating a multi-step RAG framework 200 according to some embodiments. Frameworks 100 and 200 may be performed by the same system configured to generate responses to either single or multi-hop questions using the same language model 104 and retrievers 106. Exemplary text is illustrated for the various components of framework 200. Question 102 may be a multi-hop question, for example "How many awards has the first person to walk on the moon received." This is a multi-hop question since answering the question requires first determining who was the first person to walk on the moon, and then determining how many awards they received. Decomposition of the multi-hop question may be performed by the language model 104 given an appropriate prompt instructing the language model 104 to decompose the question 102 into multiple hops of sub-questions. For example, language model 104 may be given an input prompt to generate a rationale 220a decomposing question 102 into single-hop questions. Generated rationale 220a may be, for example, "Decompose the question to answer the following single-hop questions. 1. who was the first person to walk on the moon? 2. how many awards has this person received?".

A system may generate a query 222a based on rationale 220a for use by one or more retrievers 106. For example, language model 104 may generate query 222a when prompted with rationale 220a. In some embodiments, a separate query generating module may be used to generate query 222a based on rationale 220a. For example, query 222a may be generated by a heuristic based on rationale 220a (e.g., extracting the text after the number 1 and before the number 2). In some embodiments, more than one query 222 may be generated for one or more of the retrievers 106 (e.g., by re-generating the query via language model 104 with a temperature setting allowing for differences in outputs with the same input). In some embodiments, multiple semantically diverse queries 222a are generated for respective pairs of retrievers 106 and data sources as described in FIG. 1. Query (or queries) 222a may be used by retrievers 106 to retrieve information from one or more data sources as described in FIG. 1. In the illustrated example, query 222a is "Who was the first person to walk on the moon?" which may be a query, for example, for an unstructured data source

110. In another example, query 222a is "SELECT (COUNT (?award) as ?count) WHERE{wd:Q1615 wdt:P166 ?award.}" which may be a query for a structured data source 112.

The retrieved information may be used in an updated prompt for language model 104. The updated prompt for language model 104 may include the original question 102, rationale 220a, and/or retrieved information (or a subset of the retrieved information based on a ranking as described in FIG. 1). Based on the updated prompt, language model 104 may generate a second rationale 220b. Rationale 220b may be, for example, "The first person to walk on the moon is Neil Armstrong. The second step is to answer how many awards he has received." Based on rationale 220b, the system may generate query 222b (e.g., via language model 104 or a separate query generating module). In the illustrated example, query 222b is "How many awards has Neil Armstrong received?". In some embodiments, query 222b may include multiple semantically diverse queries for a number of data sources as with query 222a. Retrievers 106 may again be used to retrieve information, this time related to query 222b as described in FIG. 1. The retrieved information may be used in a second updated prompt for language model 104 requesting a final answer 116 based on question 102, rationale 222a, rationale 220b, and/or the retrieved information (or a subset of the retrieved information based on a ranking as described in FIG. 1). In the illustrated example, answer 116 is "26". In some embodiments, the same language model 104 is used in each step described as being performed by language model 104 in FIGS. 1-2. In some embodiments, separate language models may be used for different steps. For example, if a language model is used to generate queries based on rationales, one language model may be optimized for generating rationales, and another model may be optimized for generating queries based on those rationales, and those language models may be used respectively.

Computer and Network Environment

Figure 3A:
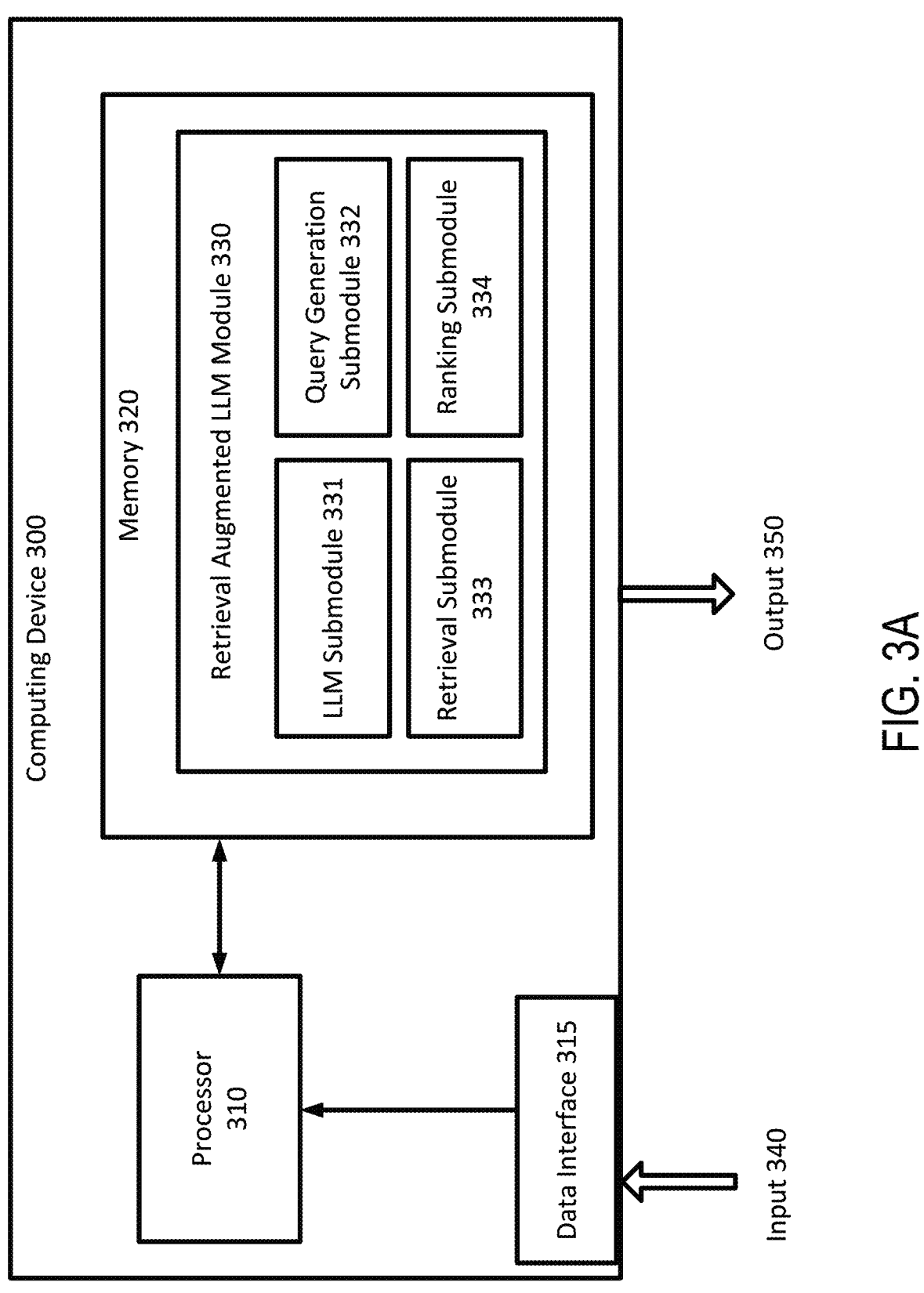
FIG. 3A is a simplified diagram illustrating a computing device implementing the retrieval augmented generation framework described in FIGS. 1-2, according to some embodiments.

FIG. 3A is a simplified diagram illustrating a computing device implementing the retrieval augmented generation framework described in FIGS. 1-2, according to one embodiment described herein. As shown in FIG. 3A, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for retrieval augmented LLM module 330 that may be used to implement and/or emulate the systems and models, and/or to implement any of the methods described further herein. retrieval augmented LLM module 330 may receive input 340 such as an input training data (e.g., question/answer pairs) via the data interface 315 and generate an output 350 which may be a generated answer to a question.

The data interface 315 may comprise a communication interface, a user interface (such as a voice input interface, a graphical user interface, and/or the like). For example, the computing device 300 may receive the input 340 (such as a training dataset) from a networked database via a communication interface. Or the computing device 300 may receive the input 340, such as a question, from a user via the user interface.

In some embodiments, the retrieval augmented LLM module 330 is configured to perform retrieval augmented generation as described in FIGS. 1-2. Retrieval augmented LLM module 330 may further include LLM submodule 331 (e.g., similar to language model 104 in FIGS. 1-2). LLM submodule 331 may be configured to perform inference functions of a language model to generate reflections, queries, and/or responses as described in FIGS. 1-2. Retrieval augmented LLM module 330 may further include query generation submodule 332. Query generation submodule 332 may be configured to generate queries as described in FIGS. 1-2. In some embodiments, query generation submodule 332 generates queries via a language model (e.g., language model 104). In some embodiments, query generation submodule 332 generates queries without the use of a language model (e.g., via heuristic). Retrieval augmented LLM module 330 may further include retrieval submodule 333. Retrieval submodule 333 may be configured to retrieve information utilizing generated queries. Retrieval may be performed over various information sources as described in FIGS. 1-2. Retrieval augmented LLM module 330 may further include ranking submodule 334. Ranking submodule 334 may be configured to rank retrieved information as described in FIGS. 1-2.

Some examples of computing devices, such as computing device 300 may include non-transitory, tangible, machine readable media that include executable code that when run by one or more processors (e.g., processor 310) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH- EPROM, any other memory chip or cartridge, and/or any other medium from which a processor or computer is adapted to read.

Figure 3B:
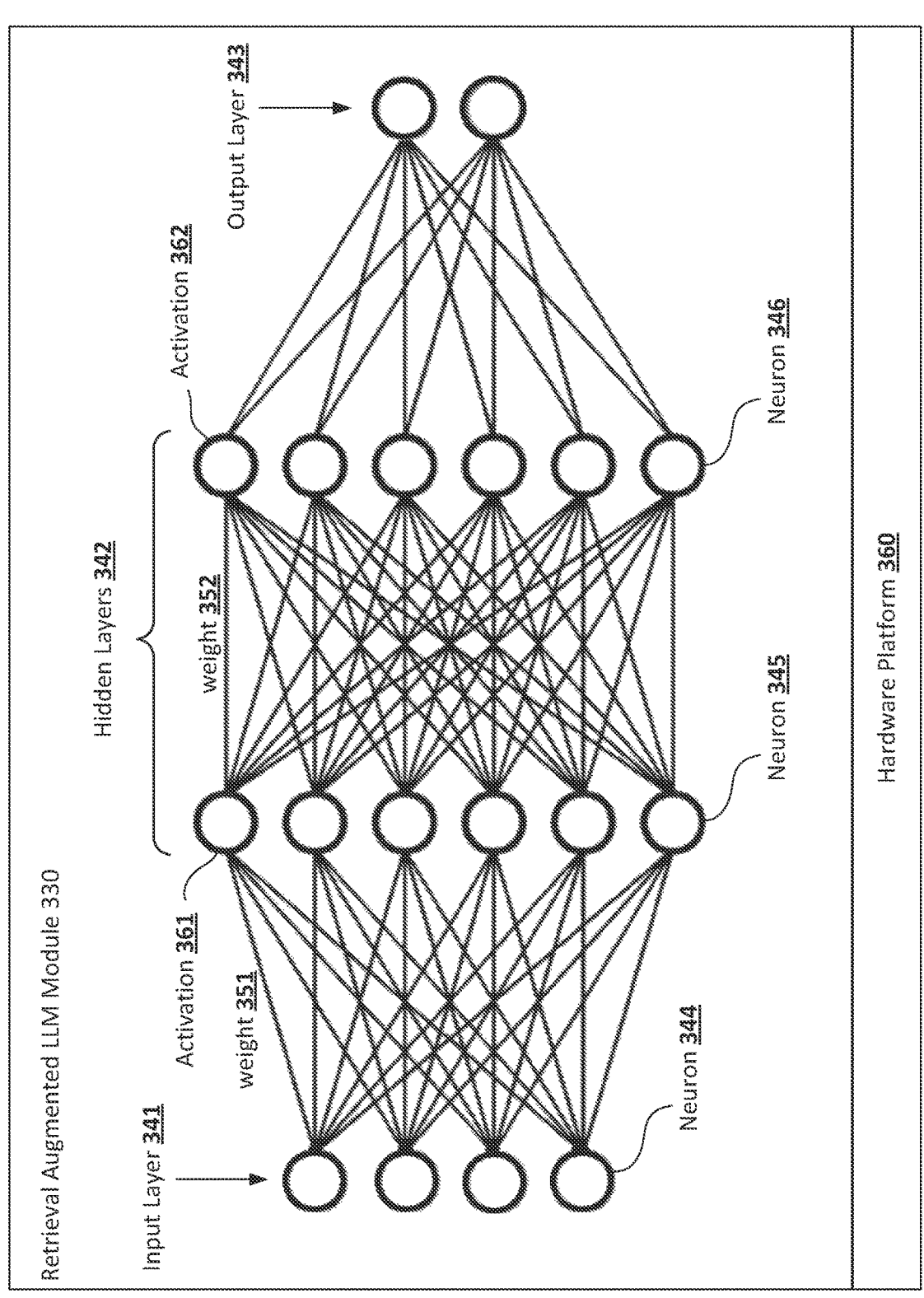
FIG. 3B is a simplified diagram illustrating a neural network structure, according to some embodiments.

FIG. 3B is a simplified diagram illustrating the neural network structure implementing the retrieval augmented LLM module 330 described in FIG. 3A, according to some embodiments. In some embodiments, the retrieval augmented LLM module 330 and/or one or more of its submodules 331-334 may be implemented at least partially via an artificial neural network structure shown in FIG. 3B. The neural network comprises a computing system that is built on a collection of connected units or nodes, referred to as neurons (e.g., 344, 345, 346). Neurons are often connected by edges, and an adjustable weight (e.g., 351, 352) is often associated with the edge. The neurons are often aggregated into layers such that different layers may perform different transformations on the respective input and output transformed input data onto the next layer.

For example, the neural network architecture may comprise an input layer 341, one or more hidden layers 342 and an output layer 343. Each layer may comprise a plurality of neurons, and neurons between layers are interconnected according to a specific topology of the neural network topology. The input layer 341 receives the input data (e.g., 340 in FIG. 3A), such as a question. The number of nodes (neurons) in the input layer 341 may be determined by the dimensionality of the input data (e.g., the length of a vector of a questino). Each node in the input layer represents a feature or attribute of the input.

The hidden layers 342 are intermediate layers between the input and output layers of a neural network. It is noted that two hidden layers 342 are shown in FIG. 3B for illustrative purpose only, and any number of hidden layers may be utilized in a neural network structure. Hidden layers 342 may extract and transform the input data through a series of weighted computations and activation functions.

For example, as discussed in FIG. 3A, the retrieval augmented LLM module 330 receives an input 340 of a question and transforms the input into an output 350 of an answer. To perform the transformation, each neuron receives input signals, performs a weighted sum of the inputs according to weights assigned to each connection (e.g., 351, 352), and then applies an activation function (e.g., 361, 362, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 341 is transformed into rather different values indicative data characteristics corresponding to a task that the neural network structure has been designed to perform.

The output layer 343 is the final layer of the neural network structure. It produces the network's output or prediction based on the computations performed in the preceding layers (e.g., 341, 342). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the retrieval augmented LLM module 330 and/or one or more of its submodules 331-334 may comprise the transformative neural network structure of layers of neurons, and weights and activation functions describing the non-linear transformation at each neuron. Such a neural network structure is often implemented on one or more hardware processors 310, such as a graphics processing unit (GPU). An example neural network may be an LLM, and/or the like.

In one embodiment, the retrieval augmented LLM module 330 and its submodules 331-334 may be implemented by hardware, software and/or a combination thereof. For example, the retrieval augmented LLM module 330 and its submodules 331-334 may comprise a specific neural network structure implemented and run on various hardware platforms 360, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 360 used to implement the neural network structure is specifically configured based on factors such as the complexity of the neural network, the scale of the tasks (e.g., training time, input data scale, size of training dataset, etc.), and the desired performance.

In one embodiment, the neural network based retrieval augmented LLM module 330 and one or more of its submodules 331-334 may be trained by iteratively updating the underlying parameters (e.g., weights 351, 352, etc., bias parameters and/or coefficients in the activation functions 361, 362 associated with neurons) of the neural network based on a loss function. For example, during forward propagation, the training data such as questions are fed into the neural network. The data flows through the network's layers 341, 342, with each layer performing computations based on its weights, biases, and activation functions until the output layer 343 produces the network's output 350. In some embodiments, output layer 343 produces an intermediate output on which the network's output 350 is based.

The output generated by the output layer 343 is compared to the expected output (e.g., a "ground-truth" such as the corresponding answer) from the training data, to compute a loss function that measures the discrepancy between the predicted output and the expected output. For example, the loss function may be cross entropy, MMSE, or other loss functions. Given the loss, the negative gradient of the loss function is computed with respect to each weight of each layer individually. Such negative gradient is computed one layer at a time, iteratively backward from the last layer 343 to the input layer 341 of the neural network. These gradients quantify the sensitivity of the network's output to changes in the parameters. The chain rule of calculus is applied to efficiently calculate these gradients by propagating the gradients backward from the output layer 343 to the input layer 341.

Parameters of the neural network are updated backwardly from the last layer to the input layer (backpropagating) based on the computed negative gradient using an optimization algorithm to minimize the loss. The backpropagation from the last layer 343 to the input layer 341 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as unseen questions.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network thus improves neural network technology in retrieval augmented generation.

Figure 4:
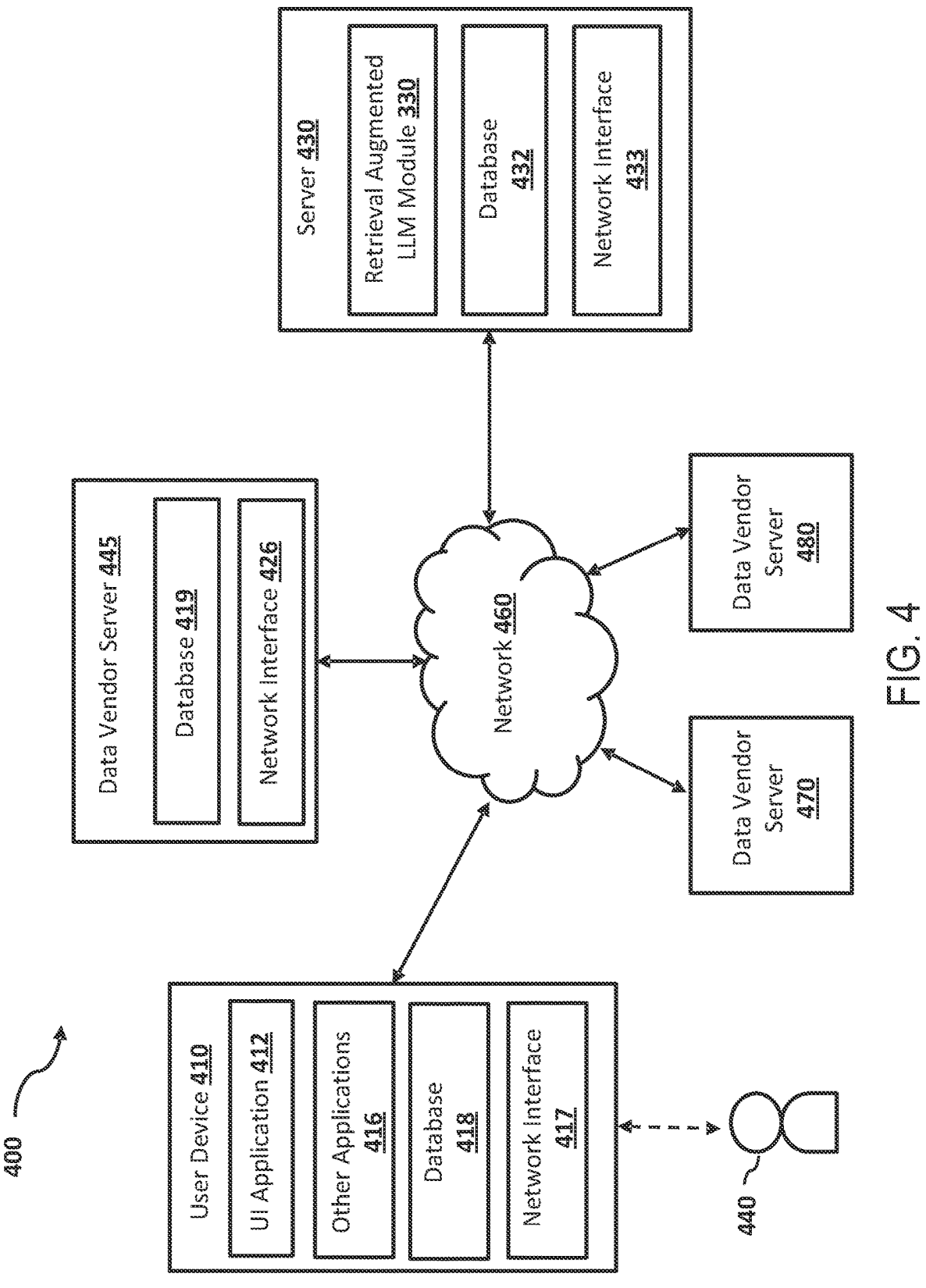
FIG. 4 is a simplified block diagram of a networked system suitable for implementing the retrieval augmented generation framework described in FIGS. 1-2 and other embodiments described herein.

FIG. 4 is a simplified block diagram of a networked system 400 suitable for implementing the retrieval augmented generation framework described in FIGS. 1-2 and other embodiments described herein. In one embodiment, system 400 includes the user device 410 which may be operated by user 440, data vendor servers 445, 470 and 480, server 430, and other forms of devices, servers, and/or software components that operate to perform various methodologies in accordance with the described embodiments. Exemplary devices and servers may include device, standalone, and enterprise-class servers which may be similar to the computing device 300 described in FIG. 3A, operating an OS such as a MICROSOFT® OS, a UNIX® OS, a LINUX® OS, or other suitable device and/or server-based OS. It can be appreciated that the devices and/or servers illustrated in FIG. 4 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 410, data vendor servers 445, 470 and 480, and the server 430 may communicate with each other over a network 460. User device 410 may be utilized by a user 440 (e.g., a driver, a system admin, etc.) to access the various features available for user device 410, which may include processes and/or applications associated with the server 430 to receive an output data anomaly report.

User device 410, data vendor server 445, and the server 430 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

User device 410 may be implemented as a communication device that may utilize appropriate hardware and software configured for wired and/or wireless communication with data vendor server 445 and/or the server 430. For example, in one embodiment, user device 410 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 410 of FIG. 4 contains a user interface (UI) application 412, and/or other applications 416, which may correspond to executable processes, procedures, and/or applications with associated hardware. For example, the user device 410 may receive a message indicating an answer from the server 430 and display the message via the UI application 412. In other embodiments, user device 410 may include additional or different modules having specialized hardware and/or software as required.

In various embodiments, user device 410 includes other applications 416 as may be desired in particular embodiments to provide features to user device 410. For example, other applications 416 may include security applications for implementing client-side security features, programmatic client applications for interfacing with appropriate application programming interfaces (APIs) over network 460, or other types of applications. Other applications 416 may also include communication applications, such as email, texting, voice, social networking, and IM applications that allow a user to send and receive emails, calls, texts, and other notifications through network 460. For example, the other application 416 may be an email or instant messaging application that receives a prediction result message from the server 430. Other applications 416 may include device interfaces and other display modules that may receive input and/or output information. For example, other applications 416 may contain software programs for asset management, executable by a processor, including a graphical user interface (GUI) configured to provide an interface to the user 440 to view answers.

User device 410 may further include database 418 stored in a transitory and/or non-transitory memory of user device 410, which may store various applications and data and be utilized during execution of various modules of user device 410. Database 418 may store user profile relating to the user 440, predictions previously viewed or saved by the user 440, historical data received from the server 430, and/or the like. In some embodiments, database 418 may be local to user device 410. However, in other embodiments, database 418 may be external to user device 410 and accessible by user device 410, including cloud storage systems and/or databases that are accessible over network 460.

User device 410 includes at least one network interface component 417 adapted to communicate with data vendor server 445 and/or the server 430. In various embodiments, network interface component 417 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 445 may correspond to a server that hosts database 419 to provide training datasets including question/answer pairs to the server 430. The database 419 may be implemented by one or more relational database, distributed databases, cloud databases, and/or the like.

The data vendor server 445 includes at least one network interface component 426 adapted to communicate with user device 410 and/or the server 430. In various embodiments, network interface component 426 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 445 may send asset information from the database 419, via the network interface 426, to the server 430.

The server 430 may be housed with the retrieval augmented LLM module 330 and its submodules described in FIG. 3A. In some implementations, retrieval augmented LLM module 330 may receive data from database 419 at the data vendor server 445 via the network 460 to generate answers. The generated answers may also be sent to the user device 410 for review by the user 440 via the network 460.

The database 432 may be stored in a transitory and/or non-transitory memory of the server 430. In one implementation, the database 432 may store data obtained from the data vendor server 445. In one implementation, the database 432 may store parameters of the retrieval augmented LLM module 330. In one implementation, the database 432 may store previously generated answers, and the corresponding input feature vectors.

In some embodiments, database 432 may be local to the server 430. However, in other embodiments, database 432 may be external to the server 430 and accessible by the server 430, including cloud storage systems and/or databases that are accessible over network 460.

The server 430 includes at least one network interface component 433 adapted to communicate with user device 410 and/or data vendor servers 445, 470 or 480 over network 460. In various embodiments, network interface component 433 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 460 may be implemented as a single network or a combination of multiple networks. For example, in various embodiments, network 460 may include the Internet or one or more intranets, landline networks, wireless networks, and/or other appropriate types of networks. Thus, network 460 may correspond to small scale communication networks, such as a private or local area network, or a larger scale network, such as a wide area network or the Internet, accessible by the various components of system 400.

Example Work Flows

FIG. 5 is an example logic flow diagram illustrating a method of retrieval augmented generation based on the framework shown in FIGS. 1-2, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method

500 corresponds to the operation of the retrieval augmented LLM module 330 (e.g., FIGS. 3A-4) that performs retrieval augmented generation.

As illustrated, the method 500 includes a number of enumerated steps, but aspects of the method 500 may include additional steps before, after, and in between the enumerated steps. In some aspects, one or more of the enumerated steps may be omitted or performed in a different order.

At step 502, a system (e.g., computing device 300 or server 430) receives, via a communication interface (e.g., data interface 315 or network interface 433), a user input (e.g., question 102) relating to providing an answer to a question.

At step 504, the system generates, by a neural network based language model (e.g., language model 104), a plurality of semantically diverse queries (e.g., query 222) based on the user input. In some embodiments the system generates, by the neural network based language model, a plurality of single-hop questions based on the user input, and the generating the plurality of semantically diverse queries is further based on the plurality of single-hop questions. The plurality of single-hop questions may be generated using a prompt comprising the user input (e.g., a multi-hop question) and a prompt template requesting that the language model generate single-hop questions based on the provided user input. The plurality of semantically diverse queries may be generated by the language model based on a prompt comprising the single-hop questions and a second prompt template requesting queries of specific types for specific retrievers (e.g., structured query, unstructured natural language query, etc). Multiple querier may be generated for one or more of the retrievers for one single-hop question, for example by using different prompt templates, or by reusing the same prompt with a non-zero temperature setting of the language model. In some embodiments, the system generates a second plurality of semantically diverse queries based on the plurality of single-hop questions, the first set of information, and the second set of information.

At step 506, the system retrieves, by a first retriever (e.g., retriever 106b), a first set of information from a structured data source (e.g., structured data 112) based on a first query from the plurality of semantically diverse queries. In some embodiments, the structured data source is a knowledge base. In some embodiments, the first query is a structured query of a format specific to the knowledge base (e.g., SPARQL). In some embodiments, additional variations of the first query may be generated, and the first retriever may retrieve additional data based on the query variants. This additional data may be included in the subsequent ranking and context for generating an answer.

At step 508, the system retrieves, by a second retriever (e.g., retriever 106a), a second set of information from an unstructured data source (e.g., unstructured data 110) based on a second query from the plurality of semantically diverse queries. In some embodiments, the system retrieves, by a third retriever, a third set of information from a linearized text version of the structured data source based on a third query from the plurality of semantically diverse queries. In some embodiments, additional variations of the second query may be generated, and the second retriever may retrieve additional data based on the query variants. This additional data may be included in the subsequent ranking and context for generating an answer.

At step 510, the system generates, by a cross-encoder model, a ranking of the first set of information and the second set of information based on a relevance to the user input.

At step 512, the system generates a context prompt combining at least a part of the first set of information and/or the second set of information based on the ranking. In some embodiments, the system further combines a second answer in the context prompt, the second answer being generated by the neural network based language model based on the user input without use of the first set of information or the second set of information. Combining the second answer may be performed based on a determination of low relevance of the first set of information or the second set of information.

At step 514, the system generates, by the neural network based language model, the answer based on the user input and the context prompt.

FIG. 6 is an example logic flow diagram illustrating a method 600 of structured query generation, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the retrieval augmented LLM module 330 (e.g., FIGS. 3A-4) that performs retrieval augmented generation.

As illustrated, the method 600 includes a number of enumerated steps, but aspects of the method 600 may include additional steps before, after, and in between the enumerated steps. In some aspects, one or more of the enumerated steps may be omitted or performed in a different order. Method 600 may be performed as part of method 500 (e.g., at step 504) or independently.

At step 602, a system (e.g., computing device 300 or server 430) in input question (e.g., question 102 or a single-hop question generated based on question 102).

At step 604, the system extracts, via a named entity recognition model, a named entity from the input question. In some embodiments, language model 104 may be used as the named entity recognition model, by prompting language model 104 for a named entity of the input question. For example, the prompt may be "what is the named entity in this question: How many awards has Neil Armstrong received?" and the named entity recognition model may generate "Neil Armstrong" or an indication (e.g., an index of the location) of "Neil Armstrong" in the input.

At step 606, the system receives, from a database (e.g., structured data source 112), an entity ID based on the named entity. The database may have an entity ID (i.e., query ID) associated with each entity (i.e., query) in the database, and may provide the entity ID upon request when provided an entity name. The system may request the entity ID using the named entity extracted at step 604. For example, the entity ID for "Neil Armstrong" may be "Q1615".

At step 608, the system receives, from the database, a list of relations associated with the entity ID. Receiving the list may be based on a query to the database in which the entity ID received at step 606 is provided with a request for relations associated with that entity ID. For example, the relations for "Neil Armstrong" may include "award received", "birth date", "Middle name", etc.

At step 610, the system determines a highest ranked relation of the list of relations based on a semantic similarity to the input question. In some embodiments, semantic similarity is calculated by using a cross-encoder to compute a vector representation of the input question and the name of each relation. A score for each relation may be a cosine similarity of the input question vector representation with each respective relation vector representation. The highest ranked (e.g., highest cosine similarity score) or highest k-ranked relations may be used in subsequent steps. For example, the highest ranked relation for the question "How many awards has Neil Armstrong received?" may be "award received".

At step 612, the system receives, from the database, a relation ID based on the highest ranked relation (or highest k-ranked relations). The database may have a relation associated with each relation in the database, and may provide the relation ID upon request when provided a relation name and/or entity name. The system may request the relation ID using the highest ranked relation determined at step 610 and/or the entity ID. For example, the relation ID for "award received" for the entity "Neil Armstrong" may be "P166".

At step 614, the system may generate a structured query, via an LLM (e.g., language model 104), based on an input prompt including the input question, the named entity, the entity ID, the highest ranked relation, and/or the relation ID. For example, a prompt may be input to the LLM requesting a structured query for a certain type of database (e.g., a SPARQL query or a SQL query) and the prompt may further include the desired information (e.g., the input question, entity ID, and relation ID). The generated structured query may be, for example, "SELECT (COUNT(?award) as ?count) WHERE{wd:Q1615 wdt:P166 ?award.}".

Example Results

FIGS. 7-11 represent exemplary test results using embodiments described herein. In the results, embodiments of the framework described herein are labeled DETLLM (Diverse rEtrieval Tool augmented LLM)

Benchmarks include a dataset referred to as DivKnowQA, a novel fact-centric multi-hop QA benchmark that requires models to utilize heterogeneous knowledge sources equitably in order to answer a question. Metrics used include percentage of answers which are an exact match (EM) to the ground-truth answer, recall score which indicates whether the ground-truth answer is a substring of the output, and F1 score as described in Yang et al., HotPotQA: A dataset for diverse, explainable multi-hop question answering, Proceedings of the 2018 Conference on Empirical Methods in Natural Language Processing, pp. 2369-2380, Brussels, Belgium, Association for Computational Linguistics, 2018. In addition, retrieval accuracy is reported for each decomposed single-hop question denoted as H1-R and H2-R. "Oracle" results represent when ground-truth data is input rather than retrieved/generated to determine how the other method steps perform given perfect inputs (e.g., ground-truth retrieved information)

Dense retrievers utilized include Contriever as described in Izacard et al., Unsupervised dense information retrieval with contrastive learning, Transactions on Machine Learning Research, 2022. Sparse retrievers used include BM25 as described in Robertson et al., The probabilistic relevance framework: BM25 and beyond, Foundations and Trends in Information Retrieval, 3(4):333-389, 2009.

Baselines used for comparison include using a "vanilla prompt" (i.e., without decomposing multi-hop questions), a retrieval-based model ReAct as described in Yao et al., React: Synergizing reasoning and acting in language models, The Eleventh International Conference on Learning Representations, ICLR 2023, Kigali, Rwanda, May 1-5, 2-23; and DSP as described in Khattab et al., Demonstratesearch-predict: Composing retrieval and language models for knowledge-intensive nlp, arXiv:2212.14024.

FIG. 7 illustrates exemplary results on answer and sub-step retrieval accuracy on the DivKnowQA dataset. ReAct exhibits lower performance compared to the Vanilla prompt. The retrieval tool created for ReAct is specialized for querying unstructured knowledge. As the presence of irrelevant passages distracts the LLM, the iterative reasoning accumulates errors, leading to less accurate answers. Conversely, DSP outperforms both Vanilla Prompt and ReAct. DSP does not effectively retrieve structured knowledge. DETLLM stands out as the top performing model, demonstrating its capability to generate symbolic language for retrieval from diverse knowledge sources. FIG. 7 also presents the single-step retrieval accuracy. Among the baseline methods, comparing single-step generation e.g. Vanilla Prompt with the multi-step generation e.g. ReAct and DSP, the retrieval accuracy increases due to the decomposed query from the multi-step generation process. On the other hand, DETLLM shows stronger retrieval performance compared to DSP due to the careful retrieval tool design, the unstructured and structured knowledge is treated separately. This finding underscores the importance of having a robust retrieval strategy to provide reliable and focused information, grounding the LLM on relevant supportive facts.

FIG. 8 illustrates the results of an ablation study involving three key factors: a) the integration of heterogeneous knowledge sources, b) the choice between dense and sparse retrievers, and c) the incorporation of SPARQL. The illustrated results indicate that optimal performance is achieved when handling heterogeneous knowledge sources separately, combined with careful retriever tool selection. The unsupervised dense retriever (i.e., Contriever), trained on natural language corpus, demonstrates adaptability to unstructured knowledge but loses its advantage when dealing with linearized structured knowledge due to the absence of natural language formatting. Conversely, the sparse retriever BM25 performs better on structured knowledge, relying on keyword-based search methodologies.

Furthermore, the SPARQL tool consistently outperforms its counterparts in all settings, showcasing improvements regardless of the integration of knowledge sources and the choice of retriever.

FIG. 9 illustrates a breakdown analysis of SPARQL generation. "QID" represents the percentage of examples with entity IDs correctly linked to Wikidata. Additionally, FIG. 9 illustrates the percentage of examples linked to the Wikidata in terms of both entity IDs and relation IDs denoted as "QID+REL". The last column, labeled "QID*", showcases the percentage of examples with great potential for accurate identification through entity disambiguation. In the experiments, first the entity name was identified from the decomposed question as a retriever query and then link the entity from the query to Wikidata. The returned results provide a list of candidate Wikidata entities, from which the most semantically similar one was selected by computing the similarity between the query and the entity's description.

FIG. 10 illustrates experimental results obtained using Oracle information. In these experiments, the model was granted access to ground-truth passages from the Oracle Text and linearized KB triplets from the KB Oracle. A notable observation is the comparison between Text Oracle and KB Oracle. KB Oracle exerts a more significant influence on the final results. This is because structured knowledge contains long-tail knowledge, showing the necessity to effectively explore structured knowledge. Furthermore, when both Text and KB Oracle sources are provided, the model's performance reaches an Exact Match (EM) rate of 48.7%, highlighting the necessity of each knowledge source.

FIG. 11 illustrates a comparison between DETLLM and LLM performance in the closed-book setting, where no external knowledge is accessible. FIG. 11 illustrates that DETLLM exhibits improvements in scenarios distinct from the closed-book setting. Only 50.8% of examples answered correctly by DETLLM are also present in the closed-book setting, highlighting the orthogonal performance of DETLLM compared to the closed-book setting. The combination of correctly answered examples accounts for 45.4% of the entire dataset. In some embodiments, the system may be configured to utilize the closed book response based on some metric such as low ranking scores for retrieved information.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for a retrieval augmented generation neural network system deployed on one or more artificial intelligence (AI) accelerators, the method comprising:

receiving, via a communication interface, a user input relating to providing an answer to a question;

generating, by a neural network based language model, a plurality of semantically diverse queries based on the user input;

retrieving, by a first retriever, a first set of information from a structured data source based on a first query from the plurality of semantically diverse queries;

retrieving, by a second retriever, a second set of information from an unstructured data source based on a second query from the plurality of semantically diverse queries;

retrieving, by a third retriever, a third set of information from a linearized text version of the structured data source based on a third query from the plurality of semantically diverse queries;

generating, by a cross-encoder model, a ranking of the first set of information, the second set of information, and the third set of information based on a relevance to the user input;

generating a context prompt combining at least a part of the first set of information and/or the second set of information and/or the third set of information based on the ranking; and generating, by the neural network based language model, the answer based on the user input and the context prompt.

2. The method of claim 1, further comprising:

generating, by the neural network based language model, a plurality of single-hop questions based on a first prompt template and the user input when the user input comprises a multi-hop question; and generating a second plurality of semantically diverse queries based on the plurality of single-hop questions, the first set of information, and the second set of information, wherein the generating the plurality of semantically diverse queries is further based on the plurality of single-hop questions and a second prompt template.

3. The method of claim 1, wherein the generating the plurality of semantically diverse queries includes:

extracting, via a named entity recognition model, a named entity from the user input;

receiving, from the structured data source, an entity ID based on the named entity;

receiving, from the structured data source, a list of relations associated with the entity ID;

determining a highest ranked relation of the list of relations based on a semantic similarity to the user input;

receiving, from the structured data source, a relation ID based on the highest ranked relation; and generating a structured query, via the neural network based language model, based on an input prompt including at least one of:

the user input, the named entity, the entity ID, the highest ranked relation, or the relation ID.

4. The method of claim 1, further comprising:

generating, by the neural network based language model, a second answer based on the user input without use of the first set of information or the second set of information, wherein the generating the context prompt further includes combining the second answer.

5. The method of claim 4, wherein the combining the second answer is based on a determination of low relevance of the first set of information or the second set of information.

6. The method of claim 1, further comprising:

generating, by the neural network based language model, a variant of the second query from the plurality of semantically diverse queries;

retrieving, by the second retriever, a set of additional data based on the variant of the second query from the plurality of diverse queries; and wherein, the second set of information includes the set of additional data based on the variant of the second query from the plurality of diverse queries.

7. The method of claim 1, wherein the structured data source is a knowledge base, and wherein the first query is a structured query of a format specific to the knowledge base.

8. A system for retrieval augmented generation, the system comprising:

a memory that stores a neural network based language model and a plurality of processor executable instructions;

a communication interface that receives a user input relating to providing an answer to a question; and one or more hardware processors that read and execute the plurality of processor-executable instructions from the memory to perform operations comprising:

generating, by the neural network based language model, a plurality of semantically diverse queries based on the user input;

retrieving, by a first retriever, a first set of information from a structured data source based on a first query from the plurality of semantically diverse queries;

retrieving, by a second retriever, a second set of information from an unstructured data source based on a second query from the plurality of semantically diverse queries;

retrieving, by a third retriever, a third set of information from a linearized text version of the structured data source based on a third query from the plurality of semantically diverse queries;

generating, by a cross-encoder model, a ranking of the first set of information, the second set of information, and the third set of information based on a relevance to the user input;

generating a context prompt combining at least a part of the first set of information and/or the second set of information and/or the third set of information based on the ranking; and generating, by the neural network based language model, the answer based on the user input and the context prompt.

9. The system of claim 8, the operations further comprising:

generating, by the neural network based language model, a plurality of single-hop questions based on a first prompt template and the user input when the user input comprises a multi-hop question; and generating a second plurality of semantically diverse queries based on the plurality of single-hop questions, the first set of information, and the second set of information, wherein the generating the plurality of semantically diverse queries is further based on the plurality of single-hop questions and a second prompt template.

10. The system of claim 8, wherein the generating the plurality of semantically diverse queries includes:

extracting, via a named entity recognition model, a named entity from the user input;

receiving, from the structured data source, an entity ID based on the named entity;

receiving, from the structured data source, a list of relations associated with the entity ID;

determining a highest ranked relation of the list of relations based on a semantic similarity to the user input;

receiving, from the structured data source, a relation ID based on the highest ranked relation; and generating a structured query, via the neural network based language model, based on an input prompt including at least one of:

the user input, the named entity, the entity ID, the highest ranked relation, or the relation ID.

11. The system of claim 8, the operations further comprising:

generating, by the neural network based language model, a second answer based on the user input without use of the first set of information or the second set of information, wherein the generating the context prompt further includes combining the second answer.

12. The system of claim 11, wherein the combining the second answer is based on a determination of low relevance of the first set of information or the second set of information.

13. The system of claim 8, wherein the structured data source is a knowledge base, and wherein the first query is a structured query of a format specific to the knowledge base.

14. The system of claim 8, further comprising:

generating, by the neural network based language model, a variant of the second query from the plurality of semantically diverse queries;

retrieving, by the second retriever, a set of additional data based on the variant of the second query from the plurality of diverse queries; and wherein, the second set of information includes the set of additional data based on the variant of the second query from the plurality of diverse queries.

15. A non-transitory machine-readable medium comprising a plurality of machine-executable instructions which, when executed by one or more processors, are adapted to cause the one or more processors to perform operations comprising:

receiving, via a communication interface, a user input relating to providing an answer to a question;

generating, by a neural network based language model, a plurality of semantically diverse queries based on the user input;

retrieving, by a first retriever, a first set of information from a structured data source based on a first query from the plurality of semantically diverse queries;

retrieving, by a second retriever, a second set of information from an unstructured data source based on a second query from the plurality of semantically diverse queries;

retrieving, by a third retriever, a third set of information from a linearized text version of the structured data source based on a third query from the plurality of semantically diverse queries;

generating, by a cross-encoder model, a ranking of the first set of information, the second set of information, and the third set of information based on a relevance to the user input;

generating a context prompt combining at least a part of the first set of information and/or the second set of information and/or the third set of information based on the ranking; and generating, by the neural network based language model, the answer based on the user input and the context prompt.

16. The non-transitory machine-readable medium of claim 15, the operations further comprising:

generating, by the neural network based language model, a plurality of single-hop questions based on a first prompt template and the user input when the user input comprises a multi-hop question; and generating a second plurality of semantically diverse queries based on the plurality of single-hop questions, the first set of information, and the second set of information, wherein the generating the plurality of semantically diverse queries is further based on the plurality of single-hop questions and a second prompt template.

17. The non-transitory machine-readable medium of claim 15, wherein the generating the plurality of semantically diverse queries includes:

extracting, via a named entity recognition model, a named entity from the user input;

receiving, from the structured data source, an entity ID based on the named entity;

receiving, from the structured data source, a list of relations associated with the entity ID;

determining a highest ranked relation of the list of relations based on a semantic similarity to the user input;

receiving, from the structured data source, a relation ID based on the highest ranked relation; and generating a structured query, via the neural network based language model, based on an input prompt including at least one of:

the user input, the named entity, the entity ID, the highest ranked relation, or the relation ID.

18. The non-transitory machine-readable medium of claim 15, the operations further comprising:

generating, by the neural network based language model, a second answer based on the user input without use of the first set of information or the second set of information, wherein the generating the context prompt further includes combining the second answer.

19. The non-transitory machine-readable medium of claim 18, wherein the combining the second answer is based on a determination of low relevance of the first set of information or the second set of information.

20. The non-transitory machine-readable medium of claim 15, wherein the structured data source is a knowledge base, and wherein the first query is a structured query of a format specific to the knowledge base.

* * * * *